United States Patent [19]

Bell et al.

[11] Patent Number: 4,908,801

[45] Date of Patent: Mar. 13, 1990

[54] REAL-TIME SIMULATION OF THE FAR-FIELD SIGNATURE OF A SEISMIC SOUND SOURCE ARRAY

[75] Inventors: Robert R. Bell; Stephen M. Whitley, both of Houston, Tex.

[73] Assignee: Teledyne Exploration, Houston, Tex.

[21] Appl. No.: 358,435

[22] Filed: May 30, 1989

[51] Int. Cl.⁴ .................................................. G01V 1/38
[52] U.S. Cl. ........................................ 367/23; 181/111; 181/118
[58] Field of Search ................... 367/23, 20, 21, 22; 181/111, 118, 113, 120

[56] References Cited

U.S. PATENT DOCUMENTS

| | | | |
|---|---|---|---|
| 4,326,271 | 4/1982 | Ziolkowski | 367/16 |
| 4,476,550 | 10/1984 | Ziolkowski et al. | 367/21 |
| 4,500,978 | 2/1985 | Ziolkowski | 367/142 |
| 4,644,507 | 2/1987 | Ziolkowski | 367/23 |
| 4,648,080 | 3/1987 | Hargreaves | 367/20 |
| 4,658,384 | 4/1987 | Dragoset et al. | 367/23 |
| 4,827,456 | 5/1989 | Brac | 367/23 |

Primary Examiner—Thomas H. Tarcza
Assistant Examiner—Ian J. Lobo
Attorney, Agent, or Firm—William A. Knox

[57] ABSTRACT

A method for extrapolating the far field signature of a seismic sound source array from near field measurements, by taking into consideration, the instantaneous firing and environmental parameters that exist locally for each individual sound source in the array.

8 Claims, 1 Drawing Sheet

REAL-TIME SIMULATION OF THE FAR-FIELD SIGNATURE OF A SEISMIC SOUND SOURCE ARRAY

BACKGROUND OF THE INVENTION

1. Field of the Invention

This invention is concerned with seismic sound source arrays such as arrays of air guns. In particular, it is concerned with the simulation, in real time, of the far field signature of the array, based upon the instantaneous field conditions that exist at the time the array is activated. Such art may be found in classes 367/20-23.

2. Discussion of the Prior Art

As is well known in the art of marine seismic surveying, a sound source is towed behind a ship beneath the surface of a body of water. The sound may be generated by a small explosive charge, an electric spark or arc, a vibrator or, preferably, an array of several air guns. The air guns each contain a volume of air compressed to about 2000 psi or more. Upon command, the guns abruptly release their volumes of compressed air to create a thunderous sound wave in the water. The resulting pressure wavefield propagates downwardly, into the earth beneath the sea floor, to the sub-bottom strata, whence the wavefield is reflected back up towards the water surface. The reflected wavefield is detected by a hydrophone array that it towed behind the ship just beneath the water surface. The hydrophone array may extend three thousand meters or more behind the ship and may include several thousand hydrophones. The detected reflected wavefields are recorded on time-scale recordings or seismograms.

When the seismic source it triggered or fired, it produces a complex output pressure pulse. The hyrophones feel that pressure pulse and convert the pressure variations to an electrical wave train. Typically, the electrical wave train consists of a short, initial, fast positive rise in amplitude, followed by several rapidly-decaying oscillations. The wavetrain might be 150 to 200 milliseconds (ms) long and it termed the "signature" of the sound source.

The wavefield generated by the sound source radiates by spherical spreading in all directions. There is a downwardly-travelling component as well as an up-going component. The air-water interface is an excellent reflecting surface with a reflection coefficient that may approach $-1$. The up-going component of the wavefield is reflected from the water surface, is reversed in polarity and becomes another downwardly-travelling wavefield, popularly known as the ghost.

The seismic sound source array is usually towed about 6 to 10 meters beneath the sea surface. Assuming a water velocity of 1500 meters per second (mps), the vertical two-way time lag between the direct primary wavefield and the ghost will be about 8 to 14 ms. The ghost interferes, in opposite polarity, with the direct wavefield to create a complex source signature. That circumstance is termed the ghost effect. The ghost is an integral part of the source signature.

The significance of the ghost effect is explained in considerable detail in U.S. Pat. No. 4,658,384, issued 04/14/87 to W. H. Dragoset et al., which is incorporated herein by reference. In that patent, it is shown that in the near field, that is, within a few tens of meters, the ghost distorts the source signature differently than in the far field. The far field is defined as that distance from the source at which the amplitude ratio between the ghost and the direct wavefield equals or exceeds 0.95. For all practical purposes, the far field is considered to exist at distances in excess of 250–300 meters from the source. As explained in the '384 patent, for various reasons, it is usually impractical to attempt to measure, experimentally, the far-field signature of a sound source array. The far-field signature is more conveniently extrapolated from near-field experiments.

One such extrapolation method is taught by the '384 patent. Another reference of interest is U.S. Pat. No. 4,648,080, issued 03/03/87 to N. D. Hargeaves. Other references of interest are U.S. Pat. Nos. 4,644,507 issued 02/17/87 to A. M. Ziolkowski, 4,476,550 issued 10/84 to Ziolkowski et al., 4,500,978 issued 02/19/85 to Ziolkowski et al., 4,326,271 issued 04/20/82 to Ziolkwski.

Instead of using standard source arrays such as would be employed in routine operations, the references required special source and receiver arrangements to make the near-field measurements. Furthermore, in the references, it was assumed that environmental and firing conditions such as sea state, source power output and fire-time delays remained ideal and/or constant. The alleged far-field signature derived by the prior art was applied willy-nilly in all data-processing algorithms as though it were Gospel but without regard to the changing operating conditions that are inevitably present during a routine geophysical survey.

As an example, consider the effect of wave height on an array measuring 30–50 meters on a side. In heavy seas with large swells, one air gun of the array might easily be five or six meters deeper than a gun at the other end of the array (see FIG. 2). The ghost would arrive at the deeper gun 8 ms later than the ghost arriving at the other gun. A composite of the individual source signatures of the array taken as a whole, would not resemble a source signature as derived from the previous-art methods that assumed ideal, constant conditions.

During the course of a seismic project, many different lines of survey are occupied. Each line may offer different operating problems that require different array configurations. Obviously, the far-field signature derived for one array configuration will not be the same as one that is derived for some other configuration. The far-field signatures must be individually determined for each line of survey to fit changing environments.

It is a purpose of the invention to provide a method for deriving the far field signature of an array of sound sources in real (or near real) time, without use of specialized equipment. The method takes into consideration the instantaneous firing and environmental conditions that exist for each of the individual units of the array at the time the array as a whole is triggered.

SUMMARY OF THE INVENTION

In accordance with this invention, prior to the beginning of an assigned line of survey, we provide an array of seismic sound sources. Each of the respective sound sources is individually fired and the resulting near field signatures are measured. The measured signatures are scaled to compensate for differences in source power outputs and are corrected for erratic fire-time delays. The signatures are then deghosted and stored in a matrix, as a function of source location in the array, to provide a library of elemental source signatures for that line.

Upon moving onto the line of survey, we sequentially occupy a plurality of seismic stations along the line. The source array is fired at each station to produce a seismogram. As each station is occupied, at the instant that the array is fired, we measure the instantaneous local firing and environmental parameters for each source of the array. We then extract the elemental signatures, corresponding to each of the source locations of those sources that actually fired, from the library. Each signature is then re-ghosted, re-scaled and corrected for the known fire-time delays in accordance with the measured instantaneous local firing and environmental parameters. The so-processed signatures are composited to create a simulated far-field signature appropriate for that seismic station. The simulated far-field signature is recorded, for archival retrieval, on the seismogram.

BRIEF DESCRIPTION OF THE DRAWINGS

The advantages and benefits of our invention will be better understood by reference to the attached detailed description and the drawings wherein.

DETAILED DESCRIPTION OF THE PREFERRED EMBODIMENT

Figure 1:
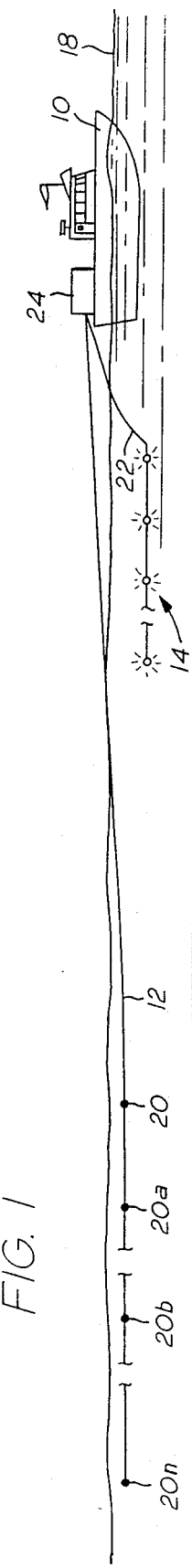
FIG. 1 shows a ship towing geophysical devices along a line of survey.

With reference to FIG. 1, there is shown a ship 10 towing a hydrophone streamer cable 12 and a sound source array 14 through a body of water 16 near the surface 18 thereof. Streamer cable 12 includes a plurality of hydrophones 20, 20a, 20b, 20n of which four are shown but as many as 1000 such instruments may be provided.

Sound source array 14 is shown to include four elements or sources, which may be air guns, but 32 to 64 such sources are not uncommon. The spacing between elements in the array is greater than one wavelength of the seismic wavefields of interest to inhibit wavefield interaction between elements. Air supply hoses and electrical control and data lines are contained within a cable assembly 22, which is connected to gun-control and data-handling interface 24 mounted aboard ship 10.

Figure 2:
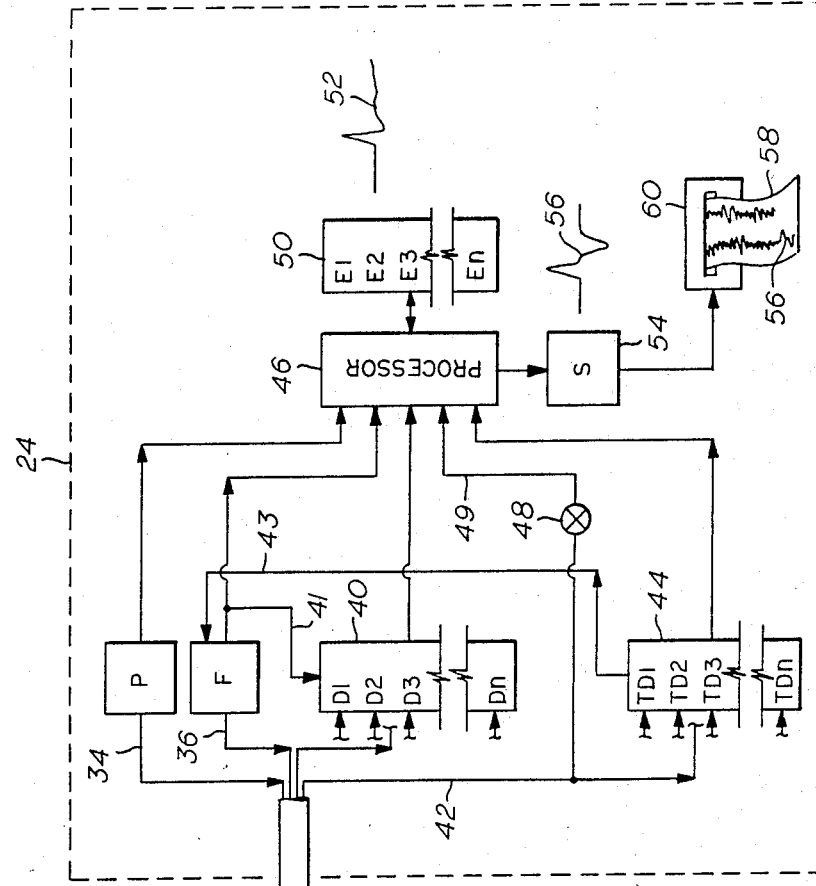
FIG. 2 is a schematic illustration of a sound source array and associated data processing devices.
Figure 2:
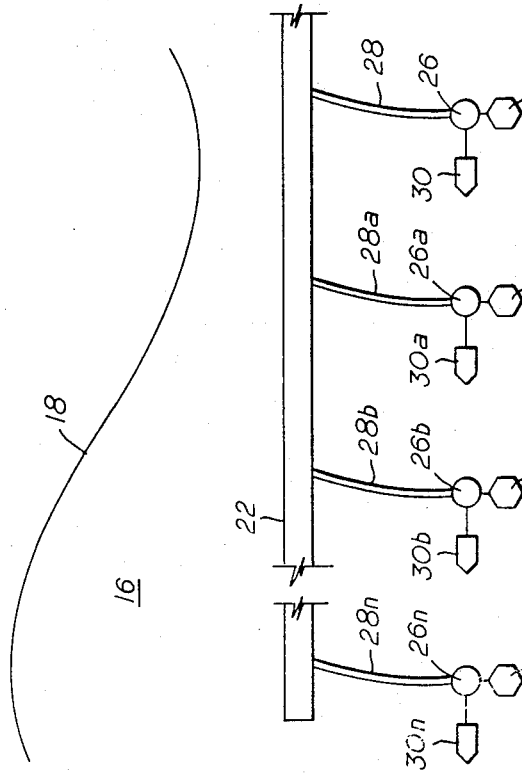

Referring now to FIG. 2, source array tow cable assembly 22 is coupled to the respective sound sources 26, 26a, 26b, 26n by takeouts 28, 28a, 28b, 28n. To each sound source, there is coupled a depth sensor 30, 30a, 30b, 30n, such as the TXC-D1 as made by the assignee of this invention. Additionally coupled to each sound source, there is a signature hydrophone such as 32, 32a, 32b, 32n, that may also serve as a fire-time detector. Usually, the signature hydrophones are mounted 10 or 15 centimeters from the gun exhaust ports.

The air supply to the guns is provided through an air line 34, that is part of tow cable assembly 22, from air supply manifold P. Air supply P also includes a suitable pressure gage (not shown) that will monitor the air pressure provided to the guns. It is assumed, for all practical purposes, that the air pressure is equalized between the manifold and the individual guns. At each gun, some of the air is tapped off and fed to the gun through the takeouts such as 28. A trigger or firing signal is transmitted to the guns over line 36, from fire control module F, through tow cable 22 and takeouts 28. Although only one firing line is shown, it should be understood that the guns may be fired individually or in unison as desired.

Depth information for the respective guns, as measured by the depth sensors such as 30, is transmitted through takeouts 28 and cable 22 to depth-parameter register 40 over line 38 to inputs $D_1$, $D_2$, $D_3$, $D_n$. Only one line is shown to avoid confusing the drawing, but as many lines as there are guns may be provided. Alternatively, a single, time-sharing, digital telemetric link could be used which might be a fiber-optic link or a wireline. Depth-parameter register 40, which may be analog or digital, receives and stores the depth of each element of the array at the instant the array is triggered; that is, register 40 records the instantaneous measured local gun depth which is the essential parameter needed for deghosting. Although depth information is always available at the inputs to register 40, the register is preferably enabled, over line 41, to receive fresh depth data only when fire controller F emits a trigger signal to the guns. Old depth data is shifted out.

Because of mechanical deficiencies, the sources do not necessarily all fire at the same instant; relative variations in fire time of one or two milliseconds or less between guns are not uncommon. As before mentioned, the signature hydrophones such as 32 measure both the signature of the corresponding gun and the instant that the gun actually fired. Usually, the relative fire-time delays between guns is consistent. The outputs from the respective signature hydrophones 32, 32a, 32b, 32n are sent through line 42 to gun controller 44 at inputs $TD_1$, $TD_2$, $TD_3$ $TD_n$. As before, only a single line 42 is shown to avoid complicating the drawing. Gun controller 44, which may be an LRS-100 unit, made by Litton Resources Systems of Houston, TX, measures the relative fire-time delays by monitoring the first arrival times of the gun signatures. It then applies, over line 43, a corrective time offset to the trigger pulses that are emitted by fire-control module F to the respective guns, so that all of the guns will effectively fire simultaneously.

A data processor 46 is provided which is preferably a digital computer or the like. Data processor 46 receives as its inputs, the air pressure existing in air supply manifold P, the fire time instant from fire control module F, The respective instantaneous depth readings from depth parameter register 40, and the relative gun fire-time delay data from gun controller 44. During the pre-line calibration operation, switch 48 is closed so that the signatures from the individual guns may be recorded and stored for further processing. Otherwise, during routine operations, switch 48 is open.

Considering now, the pre-line calibration operation, each gun is fired individually. Switch 48 is closed. The measured air pressure is entered into data processor 46 as is also the appropriate gun depth from depth parameter register 40. The signature as measured by a signature hydrophone 32 is received by processor 46. If a recent delay-time history is available for the gun under consideration, that too may be entered from gun controller 44.

In processor 46 over line 49, the amplitude of the measured signature is scaled to compensate for variations in the power output level of the gun with respect to a reference. We consider that the applied air pressure is a measure of the power output level of an air gun. In that matter, we differ from Ziolkowski, who considers that the air gun volume constitutes such a measure. We choose a reference pressure such as 2000 psi. The scaling coefficient is the difference, raised to the third power, between the actual pressure and the reference pressure. The scaled measured signature may now be corrected for fire-time delay as required.

The measured, scaled, time-corrected signature must now be deghosted. As mentioned earlier, the signature hydrophone is quite close to the air gun exhaust ports relative to the depth of the gun beneath the water surface. In the near field, the primary pulse will be considerably stronger than the later-arriving ghost. Since the gun depth and the water velocity are known, it is a simple matter for the processor to compute the ghost lag time. It looks for a negative-going pulse centered around the computed lag time and then simply zeros out that negative-going pulse. The deghosted signature is stored in a matrix 50 as a function of the gun location as part of a library of elemental signatures such as $E_1$, $E_2$, $E_3$, $E_n$, in the form of an essentially positive-going pulse such as 52. The steps supra are repeated for all of the guns in the array. Since instrumental artifacts may distort the signature, we prefer to deconvolve the elemental signatures prior to storage in matrix 50.

In the above procedure, it has been assumed that the signature hydrophones are properly calibrated and in good condition. In an alternative method, it is possible to provide separate, calibrated hydrophones for the pre-line calibration operation.

We next sequentially occupy the seismic stations along the assigned line of survey in a manner well known. For routine operations, switch 48 is open so that the inputs to processor 46 will be pressure, fire time, depth readouts and relative fire-time delays between sources. The readouts will be the instantaneous values of the firing and environmental parameters existing locally at at each gun at the time of the shot.

At each seismic station, the sound source array taken as a whole, is fired. The hydrophones in streamer cable 12 receive and record the reflected wavefields as a seismogram 58 by use of a recording system 60 that is part of control and data handling interface 24. For each source location in the array. We extract from matrix 50, the elemental signature corresponding to that location and place it in processor 46. There, the elemental signature is re-scaled in proportion to the measured power output of that source as described above. The re-scaled elemental signature is time-shifted in accordance with the known fire-time delay stored in gun controller 44. Finally, the elemental signature is reghosted in proportion to the measured instantaneous depth of the corresponding source. That step is done using the method described in U.S. Pat. No. 4,658,384 that was earlier cited. In that method, the elemental signature is inverted; the inverted pulse is then time shifted in proportion to twice the measured gun depth divided by the velocity of sound in water. The process is repeated for all of the guns of the array and the resulting processed elemental signatures are composited by simple summation. The processing steps recited supra may be performed in any convenient order.

To the left side of FIG. 2, the ocean surface 18 is shown as a large undulating swell. Since the sound sources are at depth, they remain fairly stable. With the gun depth at $32n$ much greater than the depth at gun 32, the individual simulated far-field signatures $58n$ through 58 show significantly different delays between the primary and the ghost. Unquestionably, the composite far field signature continuously changes character during an operation, an effect that must be continuously monitored.

The composite signature is convolved for instrument response and sent to signature register 54 as far-field signature 56. Far-field signatuare 56 may now be recorded on seismogram 58 in real time, for the seismic station that was just occupied.

Within any array, one or more guns may malfunction to become drop-outs. In that case, only the elemental signatures for the gus that actually fired are used in the composite signature.

Our invention has been described with a certain degree of specificity for illustrative purposes. Variations will occur to those skilled in art but which may be included within the scope and spirit of this invention which is limited only by the appended claims.

We claim as our invention:

1. A method for real-time simulation of the far field signature of an array of a plurality of seismic sound sources, comprising:

individually firing each of the respective seismic sound sources of the array;

separately measuring the near field signature of each said seismic sound source;

scaling the respective measured signatures with respect to a reference to compensate for variations in the power output levels of the sources;

correcting the measured, scaled signatures for fire time delays;

deghosting the measured, scaled, corrected signatures;

separately storing in a matrx, as a function of the respective source locations in the array, each of the measured, scaled, corrected and deghosted signatures to form a library of elemental near field seismic source signatures;

occupying sequentially, a plurality of seismic stations in an assigned area of survey;

at each said station, firing the array of seismic sound sources, taken as a whole and recording a seismogram;

for each source location in the array, measuring the instantaneous local firing and environmental parameters at the time of firing;

extacting from said library the elemental signatures coresponding to each said source location;

creating a simulated far field signature that is characteristic of the station occupied, by processing each of the extracted elemental signatures to compensate for variations in the instantaneous local firing and environmental parameters as measured at the respective corresponding source locations in the array; and compositing said processed signatures.

2. The method as defined by claim 1, comprising:

recording said simulated far field signature on said seismogram.

3. The method as defined by claim 1, wherein the insantaneous local firing and environmental parameters include at least the individual seismic source depths, the power output level of each source and the respective inherent relative delays in the firing times of the sources.

4. The method as defined by claim 1, wherein the step of processing comprises the steps of:

reghosting each said elemental signature in proportion to the measured instantaneous depth of the corresponding source;

re-scaling each elemental signature in proportion to the measured power output of the corresponding source;

offsetting, in time, each elemental signature in proportion to the known fire-time delay associated with each said source.

5. The method as defined by claim 1, comprising the step of:
deconvolving the elemental signatures with respect to instrumental response prior to the step of storing.

6. The method as defined by claim 1, comprising the step of:
convolving the processed composited elemental signatures with respect to instrumental response.

7. the method as defined by claim 1 wherein said step of individually firing is performed prior to the step of occupying said seismic stations along said assigned line of survey.

8. The method as defined by claim 1, wherein the step of extracting is accomplished only for those source locations corresponding to seismic sound sources that actually fired.

* * * * *